United States Patent
Moretti (10) Patent No.: US 9,164,697 B2
(45) Date of Patent: Oct. 20, 2015

(54) METHOD AND ARCHITECTURE FOR HIGHLY SCALABLE DATA STORAGE

(71) Applicant: Samsung Electronics Co., Ltd., Suwon-si (KR)

(72) Inventor: Michael Moretti, Saratoga, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 129 days.

(21) Appl. No.: 13/924,622

(22) Filed: Jun. 24, 2013

(65) Prior Publication Data

US 2014/0379947 A1    Dec. 25, 2014

(51) Int. Cl.
  *G06F 3/00* (2006.01)
  *G06F 13/12* (2006.01)
  *G06F 3/06* (2006.01)

(52) U.S. Cl.
  CPC ............ *G06F 3/0659* (2013.01); *G06F 3/0604* (2013.01); *G06F 3/0685* (2013.01)

(58) Field of Classification Search
  None
  See application file for complete search history.

(56) References Cited

U.S. PATENT DOCUMENTS

| | | | | |
|---|---|---|---|---|
| 6,141,707 A | * | 10/2000 | Halligan et al. | 710/36 |
| 8,549,516 B2 | * | 10/2013 | Warfield | 718/1 |
| 8,880,800 B2 | * | 11/2014 | Mathew et al. | 711/114 |

* cited by examiner

*Primary Examiner* — Idriss N Alrobaye
*Assistant Examiner* — Richard B Franklin
(74) *Attorney, Agent, or Firm* — Renaissance IP Law Group LLP (57) ABSTRACT

An invention is provided for highly scalable data storage. The invention includes a logical storage device having a logical device queue, where the logical device queue includes a plurality of command slots for storing input/output commands. Also included is a plurality of I/O worker processes, each associated with a command slot of the logical device queue, and a logical device queue process which is associated with the logical storage device. When a command is placed in the logical device queue, the logical device queue process provides an index for the command to an I/O worker process associated with the command slot storing the command. The I/O worker process then obtains the command from the logical device queue and facilitates completion of the command.

20 Claims, 6 Drawing Sheets

FIG. 6

METHOD AND ARCHITECTURE FOR HIGHLY SCALABLE DATA STORAGE

BACKGROUND OF THE INVENTION

1. Field of the Invention

This invention relates generally to large scale storage systems, and more particularly to a highly scalable storage system for delivering high I/O operations per second (IOPS) via multiple I/O threads.

2. Description of the Related Art

Today's large companies and organizations require large-scale high technology computing environments. Such environments require equally large-scale data storage capabilities. In response, the industry of enterprise storage has formed to provide large scale data storage having high reliability, better fault tolerance, as well as a vast amount of available data storage.

Enterprise storage systems often rely on very large disk farms. Reliance upon these disk farms is based upon an assumption that the underlying individual storage components are low-performing, hence associated functionality (example: caching on RAID systems) is focused on alleviating the limitations that are imposed by having to maintain fault tolerance. However, access to such storage is still based on utilization of the operating system's driver stacks.

Although conventional enterprise storage architectures may utilize distributed clusters of storage and specialized high-performance applications, they all utilize the traditional operating system stacks and do not access the data storage directly. Because traditional operating system processes and threads are complicated and inefficient, conventional enterprise storage architectures do not support concurrency for I/O processing.

In view of the foregoing, there is a need for systems and methods that provide a highly scalable storage system for delivering high I/O operations per second (IOPS) via multiple I/O threads. As such, what is needed is an architecture that identifies concurrency in I/O processing for modules and processes at the architectural level to most efficiently utilize CPU power to achieve very high I/O operations per second (IOPS). The architecture should take into account multiple storage components in a system, and be scalable across multiple processing units. For easier maintainability, the system should be capable of operating within a traditional operating-system-based model.

SUMMARY OF THE INVENTION

Broadly speaking, embodiments of the present invention address these needs by providing a highly scalable data storage architecture that uses multiple I/O worker processes to achieve concurrency and high IOPS. In one embodiment, an architecture for scalable data storage is disclosed. The architecture includes a logical storage device having a logical device queue, where the logical device queue includes a plurality of command slots for storing input/output commands. Also included is a plurality of I/O worker processes, each associated with a command slot of the logical device queue. A logical device queue process also is included that is associated with the logical storage device. When a command is placed in the logical device queue, the logical device queue process provides an index for the command to an I/O worker process associated with the command slot storing the command. The I/O worker process then obtains the command from the logical device queue and facilitates completion of the command. The architecture can also include a plurality of transport processes, each associated with a physical storage device. The transport processes convert commands into protocol specific commands suitable for use with the associated physical storage device. The device queue process can be a block device queue process or an application device queue process. Block device queue processes are associated with a block device driver within an operating system. Application device queue processes are associated with an application that provides commands to the logical storage device directly.

A method for scalable data storage is disclosed in a further embodiment of the present invention. The method includes receiving a command for a logical storage device, where the logical storage device is associated with a logical device queue having a plurality of command slots for storing commands. As above, an I/O worker process is associated with each command slot of the logical device queue. Next, the command is stored in the logical device queue. Then a device queue process provides an index of the command to an I/O worker process associated with the command slot storing the command. The I/O worker process then obtains the command from the logical device queue, and provides the command to a transport process that is associated with a physical storage device. The transport process then converts the command into a protocol specific command suitable for use with the associated physical storage device. In general, each I/O worker process is capable of associating with at least two transport processes. Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

An invention is disclosed for a highly scalable data storage architecture for delivering very high input/output operations per second (IOPS). In general, embodiments of the present invention present a plurality of logical storage devices to the operating system and applications, where each logical storage device is associated with one or more physical storage devices. Each logical storage device has an associated device command queue having a plurality of command slots.

Embodiments of the present invention create a storage access layer I/O worker process for each command slot. In addition, each logical storage device has an associated device queue process that interfaces with the device command queue. In operation, I/O commands for a particular logical storage device are placed in the associated command queue. For each command placed in the command queue, the associated device queue process provides an index of command to the storage access layer I/O worker process associated with the particular command slot storing the I/O command. The storage access layer I/O worker process then obtains the command from the associated command slot and processes the I/O command.

In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

Figure 1:
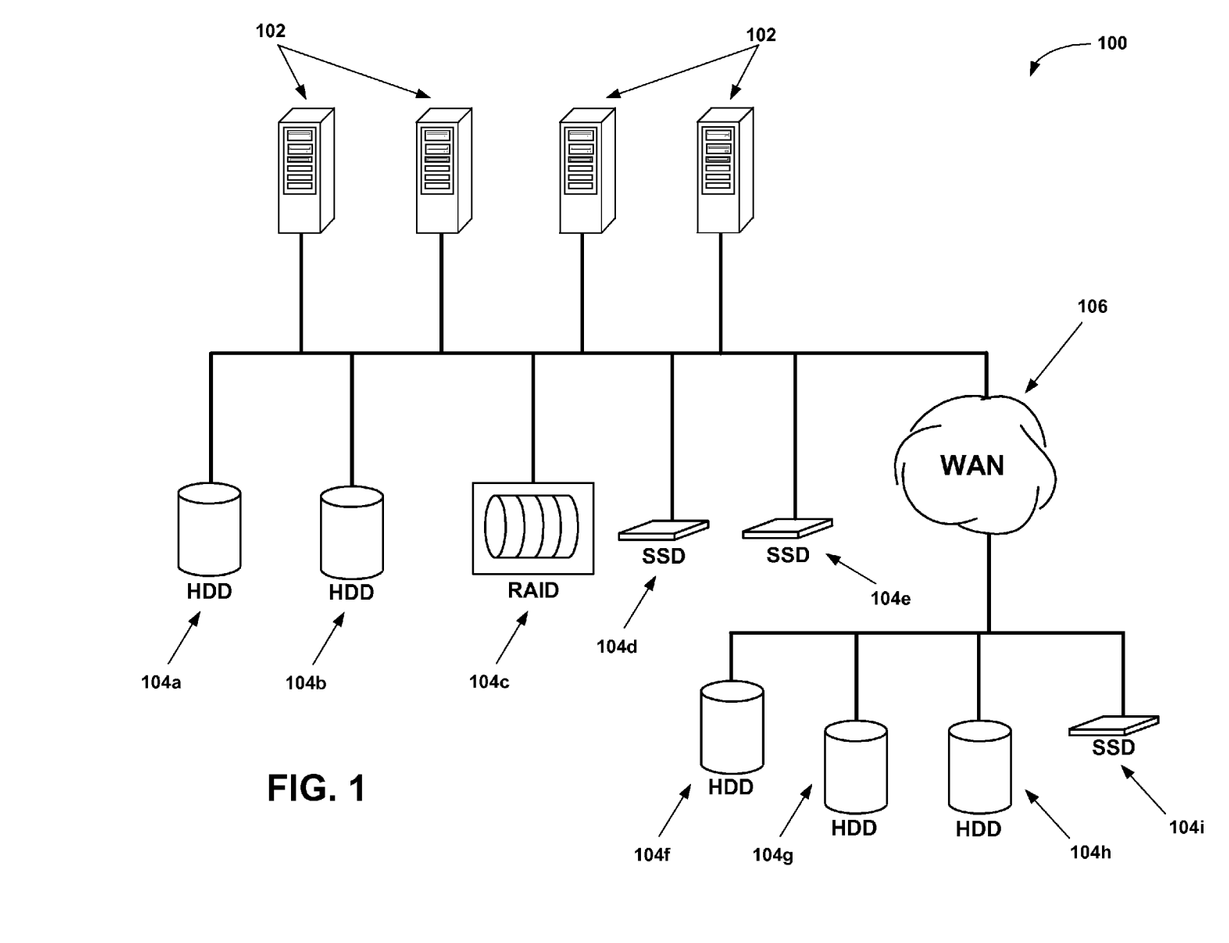
FIG. 1 is a block diagram showing an exemplary computer network having a highly scalable storage architecture, in accordance with an embodiment of the present invention.

FIG. 1 is a block diagram showing an exemplary computer network 100 having a highly scalable storage architecture, in accordance with an embodiment of the present invention. The computer network 100 includes a plurality of computer systems 102, each having one or more cores in a network configuration. Each computer system 102 is in communication with a plurality of physical storage devices 104a-104e, each capable of storing data for the computer systems 102. In addition, the computer systems 102 are in communication with a plurality of storage devices 104f-104i via a wide area network (WAN) 106, such as the Internet. It should be noted that the storage devices 104a-104i of the exemplary computer network 100 can be any storage device capable of storing data, such as hard disk drives (HDDs), solid state drives (SSDs), tape storage, optical storage, RAID storage, or any other storage device that will be apparent to those skilled in the art after a careful reading of the present disclosure.

As will be discussed in greater detail subsequently, embodiments of the present invention provide a highly-scalable architecture for delivering very high I/O Operations per Second (IOPS) and very high I/O bandwidth, efficiently utilizing multi-core, multi-disk systems, with the ability to scale across multiple systems. Embodiments of the present invention achieve very high parallelization of I/O operations via the use of a platform that can support hundreds of thousands of lightweight processes that communicate using messages and that do not need to share state.

The architecture can support multiple classes of storage devices, is repeatable, and scalable as more storage devices, or more storage-transport channels, or more CPUs are added to a system and as more systems are added to a network of such systems. Embodiments of the present invention allow storage installations to be configured in various combinations and, as an installation grows, scale with the installation.

Furthermore, the architecture provides for easy and focused addition of plug-ins that enhance the functionality, while benefiting from a framework that is capable of very high performance. For example, plug-ins can include: striping, mirroring, caching, virtualization, hierarchical storage management, and others. Whether the result is a modified behavior, or stacked functionality, embodiments of the present invention allow for easier verification and maintenance in production.

Figure 2:
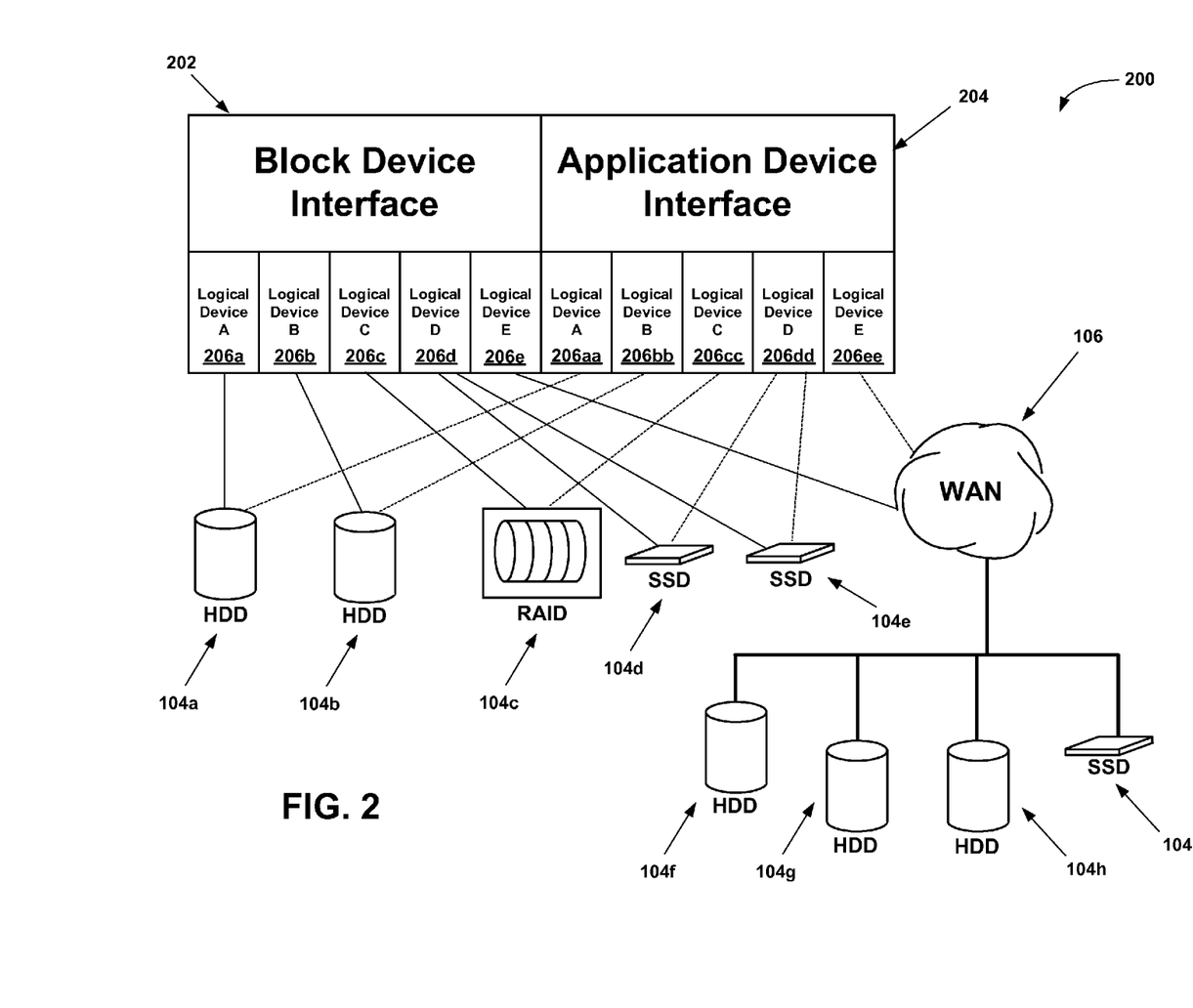
FIG. 2 is a logical diagram illustrating a highly scalable data storage architecture, in accordance with an embodiment of the present invention.

FIG. 2 is a logical diagram illustrating a highly scalable data storage architecture 200, in accordance with an embodiment of the present invention. The architecture 200 executes over a platform that provides the ability to structure I/O processing as units of concurrent execution ('processes'). A single unit of logical functionality in the architecture is represented by a process that is defined once. Thousands of processes, performing the same or many different logical functions, can be efficiently replicated by the platform. One or many processes can be scheduled automatically in a single core, across multiple cores in a system, or across multiple systems. Thus, the number of running processes can grow to meet the I/O load placed on the system, and the scalability of the system is bounded only by the actual number of cores and systems. As will be discussed below, each process implements its I/O-related work using a synchronous or asynchronous model, with the platform taking care of the scheduling involved therein.

The platform supports a simple and opaque facility for messaging and event notification among processes. Additionally, platform-controlled protection of a module's state is provided, which eliminates the necessity for system awareness or the implementation of locks in the functional logic. A process could be run in platform-supervised mode, if the behavior that it implements warrants it. The platform supports automatic recovery of a failed process, to the specific extent defined for the recoverable process. Another important ability of the platform is 'hot', dynamic update of any component in the system with new code or even new behavior.

In general, the architecture 200 presents the underlying storage to the system via a block device interface 202 and an application device interface 204. The block device interface 202 presents the underlying storage as one or more block devices, in a manner that is appropriate to the particular operating system being utilized, and visible at the highest and most generic level that is independent of protocol-dependent stacks. The application device interface 204 presents the underlying storage through an application interface, which allows the application to interact with the underlying storage without needing to use the operating system kernel and I/O stack, and thus avoiding the latency associated therewith.

To provide the above described functionality, embodiments of the present invention group the physical devices 104a-104i of the system into a plurality of logical devices 206a-206ee, which are presented to the system as available storage devices. Specifically, the physical storage devices 104a-104i of the system are grouped into a plurality of logical devices for the block device interface 202 and the application device interface 204. For example, in FIG. 2, the physical storage devices 104a-104i have been grouped into logical devices 206a-206e for the block device interface 202, and logical devices 206aa-206ee for the application device interface 204.

Each logical device 206a-206ee is in communication with one or more actual physical storage device s 104a-104i, and is presented to the system as a single logical storage device, regardless of the actual number of physical storage devices that are associated with the particular logical device. For example, in FIG. 2, logical device A 206a of the block device interface 202 is associated with physical storage device 104a. Logical device D 206d of the block device interface 202 is associated with two physical storage devices: physical storage device 104d and 104e, which are presented to the system as a single logical device (i.e., logical device D 206d). Similarly, Logical device E 206e of the block device interface 202 is associated with physical storage devices 104f, 104g, 104h, and 104i, via a WAN 106, all of which are presented to the system as a single logical device (i.e., logical device E 206e). As a result, when the system or application requests access to storage, the block device interface 202 or application device interface 204 provides access via the appropriate logical device, as described in greater detail next with reference to FIG. 3.

Figure 3:
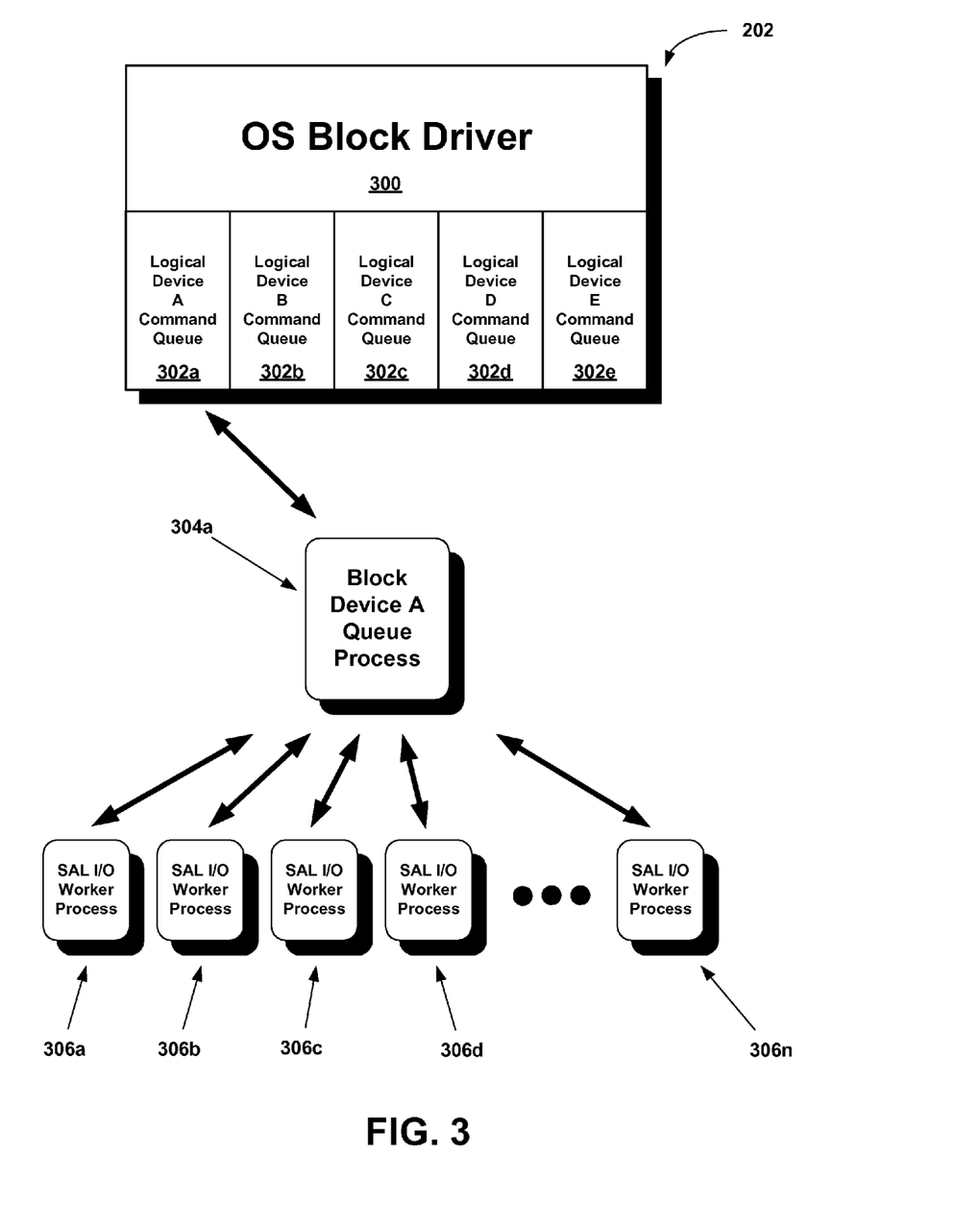
FIG. 3 is a logical block diagram showing an exemplary block device interface, in accordance with an embodiment of the present invention.

FIG. 3 is a logical block diagram showing an exemplary block device interface 202, in accordance with an embodiment of the present invention. The block device interface 202 includes an operating system (OS) block device driver 300 having a plurality of logical device command queues 302a-302e, one for each logical device associated with the block device interface 202. For example, FIG. 3 illustrates a logical device A command queue 302a for I/O commands directed to logical device A 206a, a logical device B command queue 302b for I/O commands directed to logical device B 206b, and so forth. In addition, a block device queue process 304 is associated with each logical device associated with the block device interface 202.

When a new logical device is created, embodiments of the present invention generate a logical device command queue 302 and a block device queue process 304 for the newly created logical device. In addition, a storage access layer (SAL) I/O worker process 306 is generated for each command slot of the logical device command queue 302. For example, if a logical device command queue 302 includes 256 command slots for I/O commands, 256 SAL I/O worker processes 306a-306n are generated. Each generated SAL I/O worker process 306a-306n is associated with a particular command slot of the associated logical device command queue 302 and is responsible for handling the I/O commands placed in its associated command slot.

The block device queue process 304 associated with the particular logical device facilitates transfer of I/O commands to the respective SAL I/O worker process 306. More specifically, when an I/O command is presented to the OS block driver 300 for a particular logical device, the OS block driver 300 places the I/O command in the logical device command queue 302 of the selected logical device. For example, when an I/O command is received for logical device A 206a, the OS block driver 300 places the I/O command in the logical device A command queue 302a associated with logical device A 206a. The block device A queue process 304a, which is associated with logical device A 206a, provides an index of the particular command slot storing the I/O command to the SAL I/O worker process 306 associated with the particular command slot. The selected SAL I/O worker process 306 then obtains the I/O command from its associated command slot and handles completion of the I/O command. In this manner, IOPS are increased as each SAL I/O worker process 306 operates independently to complete the commands placed in the associated logical device command queue 302.

Figure 4:
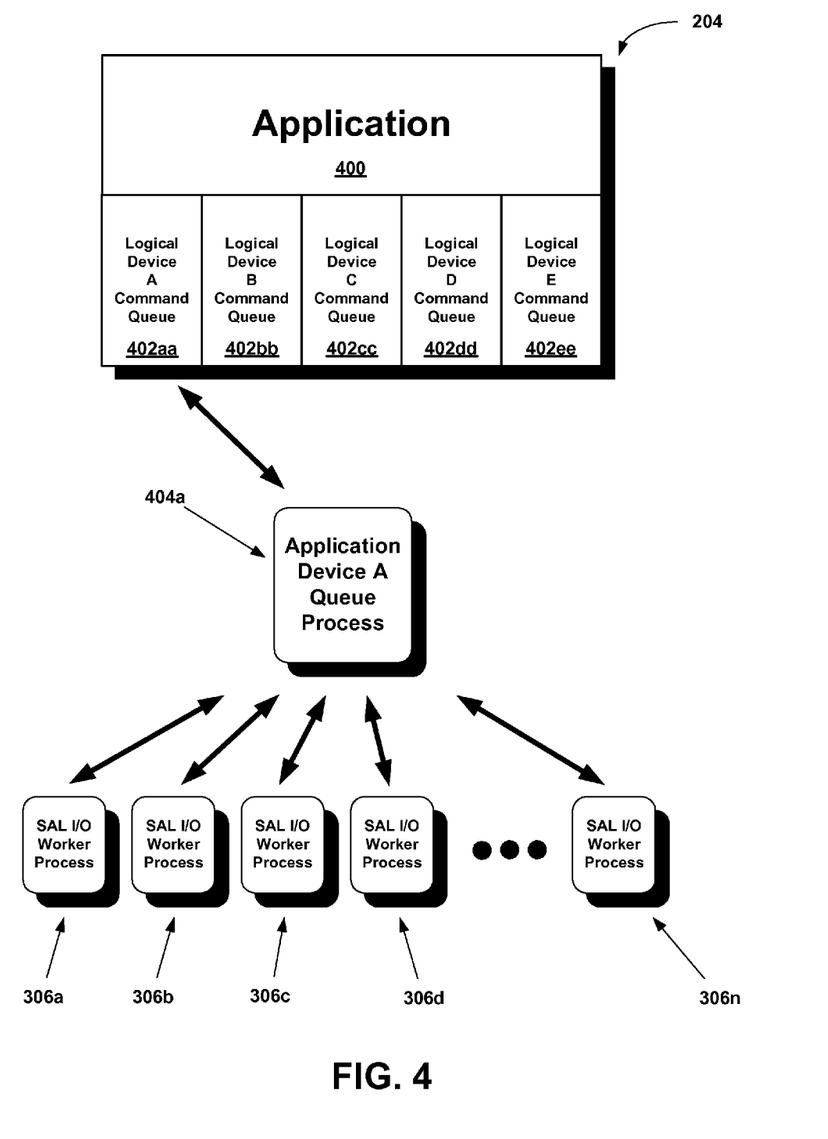
FIG. 4 is a logical block diagram showing an exemplary application device interface, in accordance with an embodiment of the present invention.

The application device interface functions in a similar manner to allow applications to directly interface with the underlying storage. FIG. 4 is a logical block diagram showing an exemplary application device interface 204, in accordance with an embodiment of the present invention. The application device interference 204 includes a plurality of logical device command queues 402aa-402ee, one for each logical device associated with an application 400. For example, FIG. 4 illustrates a logical device A command queue 402a for I/O commands directed to logical device A 206aa, a logical device B command queue 402bb for I/O commands directed to logical device B 206bb, and so forth. In addition, an application device queue process 404 is associated with each logical device associated with the application 400.

When a new logical device is created for the application device interface 204, embodiments of the present invention generate a logical device command queue 402 and an application device queue process 404 for the newly created logical device. In addition, a SAL I/O worker process 306 is generated for each command slot of the logical device command queue 402. Each generated SAL I/O worker process 306a-306n is associated with a particular command slot of the associated logical device command queue 402 and is responsible for handling the I/O commands placed in its associated command slot.

The application device queue process 404 associated with the particular logical device facilitates transfer of I/O commands to the respective SAL I/O worker process 306. When an application 400 presents an I/O command for a particular logical device, the I/O command is placed in the logical device command queue 402 of the selected logical device. For example, when an application 400 presents an I/O command for logical device A 206aa, the I/O command is placed in the logical device A command queue 402aa associated with logical device A 206aa. The application device A queue process 404a, which is associated with logical device A 206aa, provides an index of the particular command slot storing the I/O command to the SAL I/O worker process 306 associated with the particular command slot. The selected SAL I/O worker process 306 then obtains the I/O command for its associated command slot and handles completion of the I/O command, as described next with reference to FIG. 5.

Figure 5:
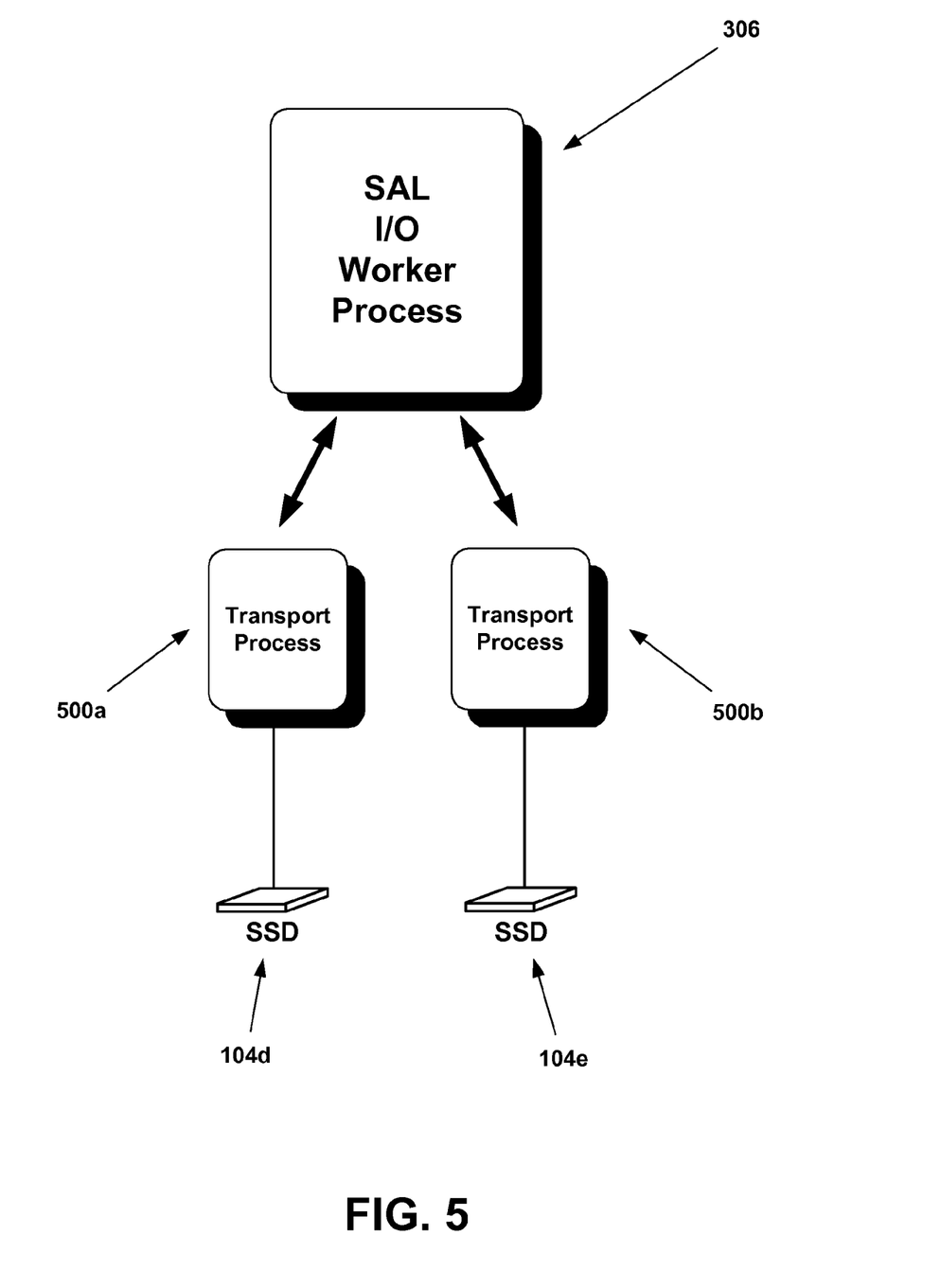
FIG. 5 is a logical block diagram showing an exemplary SAL I/O worker process data flow, in accordance with an embodiment of the present invention.

FIG. 5 is a logical block diagram showing an exemplary SAL I/O worker process data flow, in accordance with an embodiment of the present invention. As illustrated in FIG. 5, each SAL I/O worker process 306 is associated with one or more transport processes 500, which facilitate access to associated physical storage devices 104 of the underlying storage. In general, each port or controller of the network is associated with a transport process 500, which is responsible for converting I/O commands to protocol-specific formats for the associated physical storage device. The transport process 500 also issues the converted I/O commands to the relevant physical storage devices in a transport-specific manner. Each transport process 500 also is responsible for the detection of the completion of the commands it issues. At the completion of an I/O command, the transport process 500 sends the completion information directly to the associated SAL I/O worker process 306 specified in the command itself.

For example, in FIG. 5, when the SAL I/O worker process 306 obtains an I/O command for its associated command slot, the SAL I/O worker process 306 provides the I/O command to the transport processes 500a and 500b associated with the SAL I/O worker process 306. Each transport process 500a and 500b converts its portion of the I/O command to protocol-specific formats for the associated physical storage devices 104d and 104e. Each transport process 500a and 500b also issues the converted I/O command to the relevant physical storage devices 104d and 104e in a transport-specific manner.

Figure 6:
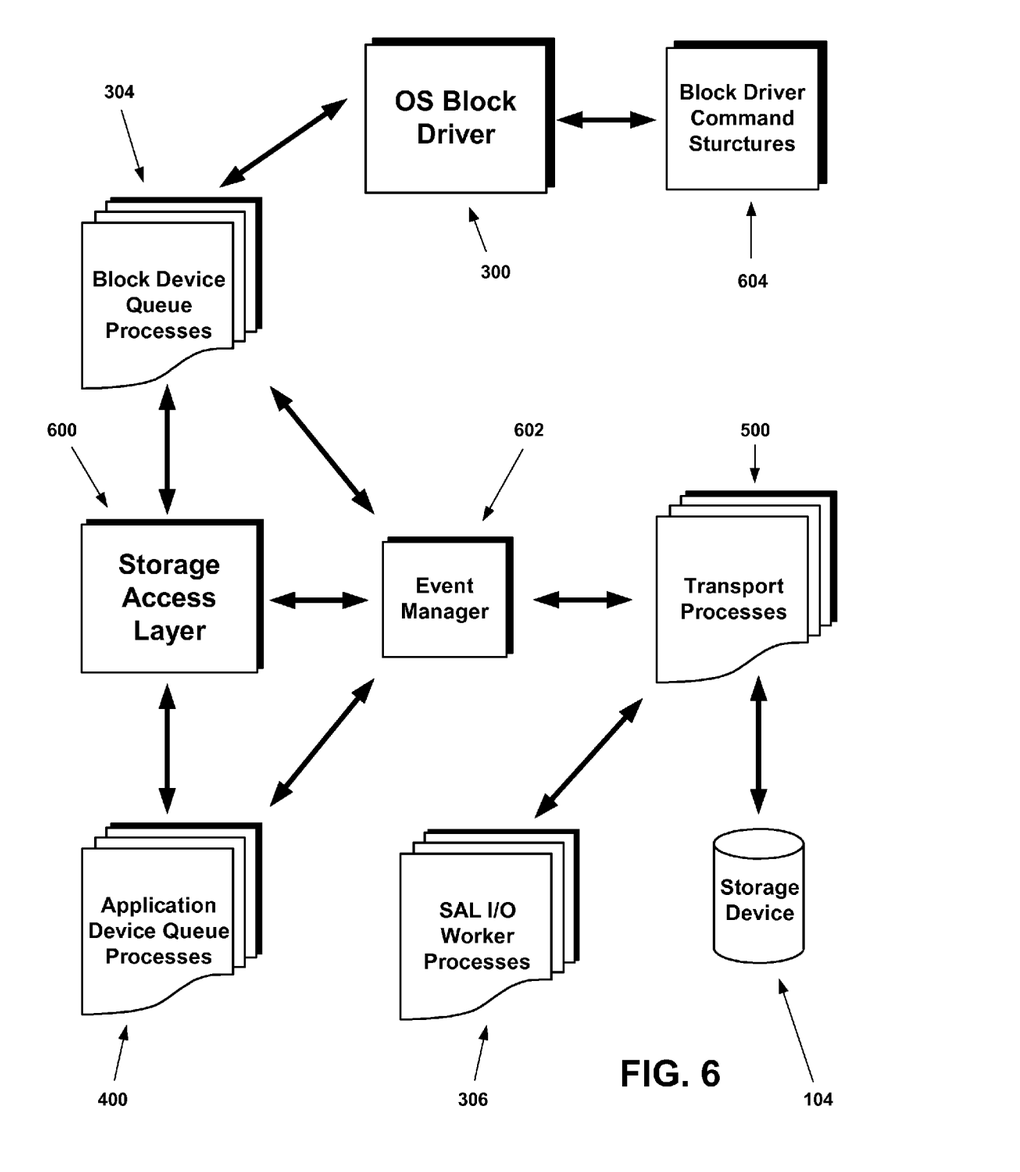
FIG. 6 is logical diagram showing the interaction of the modules of a highly scalable storage architecture, in accordance with an embodiment of the present invention.

FIG. 6 is logical diagram showing the interaction of the modules of a highly scalable storage architecture, in accordance with an embodiment of the present invention. As described above and illustrated in FIG. 6, the highly scalable storage architecture of the embodiments of the present invention includes a storage access layer 600 in communication with a plurality of block device queue processes 304 and a plurality of application device queue processes 400. In addition, the storage access layer 600 is in communication with an event manager 602, which provides event management and notification to the modules of the architecture. Each block device queue process 304 is in communication with the OS block driver 300, which provides access to the block driver command structures 604. In addition, a plurality of SAL I/O worker processes 306 are included that facilitate completion of I/O commands. Each SAL I/O worker process is in communication with one or more transport processes 500, which facilitate access to the actual physical storage devices 104 of the network.

The storage access layer 600 is the destination of events and notices resulting from the discovery of each physical storage device 104 on the transport interface. It is in the storage access layer 600 that logical devices and their associations with transport devices, and the attributes associated with the logical devices, are created.

The storage access layer 600 functions also include the interpretation of configuration data, maintenance of logical metadata on devices, and management of steps in ensuring the readiness of a logical device for I/O access. It is involved in the creation of a block device queue processes 304 and application device queue processes 400 for access to a logical device, and for the starting and supervision of the SAL I/O worker processes 306.

The storage access layer 600 creates a block device queue process 304 for each logical device presented to the operating system. The block device queue process 304 supports a message-queue interface to the OS block device driver 300 running in the OS' kernel mode. As described previously, the OS block device driver 300 creates each command in a 'slot' in its private command-structure memory 604. To issue a command, the OS block device driver submits the index of the command's slot on the message queue to the associated block device queue process 304. The block device queue process 304 continually pulls command indexes off the logical device command queue 302 and forwards each index to the associated SAL I/O worker process 306 responsible for executing a command submitted on that slot. The association between each command slot and the I/O worker process is set up at the time of creation of the block device queue process 304.

In addition, an application device queue process 400 is created for each logical storage device presented to an application. The application device queue processes 400 are similar to the block device queue processes 304. As a result, applications accessing a logical device via an application device queue process 404 can achieve significantly higher IOPS than can be achieved by accessing the same device via the interface supported by the OS' device subsystem.

The event manager 602 provides a means for other modules in the system, such as the storage access layer 600, to hook up handlers for event processing. The event manager 602 also supports persistent logging of events, filtered by the severity level of the event. Logging can be to multiple outputs, and can be controlled dynamically.

To facilitate command conversion to protocol-specific formats required by the physical storage devices 104 of the system, there is at least one transport process 500 for each port and/or host bus adapter (HBA) on the transport interface that controls the physical storage devices used by the system. For example, in one embodiment, a transport process 500 can be created per physical device.

As mentioned previously, each transport process 500 performs discovery of the physical devices 104 attached, and generate events, enclosing the information necessary for accessing the device for I/O. This information includes not only the device's attributes, but also the identifier for the transport process 500 to which transport commands for the device are forwarded.

Each transport process 500 also is responsible for converting I/O commands to the protocol-specific formats, and issuing the converted I/O commands to the relevant physical storage devices 104 in a transport-specific manner. In addition, each transport process 500 is responsible for the detection of the completion of the commands it issued. At the completion of a command, the transport process 500 sends the completion information directly to the SAL I/O worker process 306 specified in the command itself.

As described above, a SAL I/O worker process 306 is created for each command slot in each logical device command queue in the system. The SAL I/O worker processes 306 are concurrently executed, each dedicated to executing a logical operation to its completion. In one embodiment, the logic executing in each SAL I/O worker processes 306 can be simple and sequential. However, many such SAL I/O worker processes 306 can be executed concurrently. As a result, the storage access layer 600 can scale dynamically with I/O activity, and across the processing resources available. Moreover, the SAL I/O worker processes 306 allow for maximum overlap in I/O processing, thus significantly increasing the aggregate IOPS of the system.

It should be noted that each SAL I/O worker process 306 can have different and individual attributes that allow each SAL I/O worker processes 306 to function in different and specific ways. For example, a specific SAL I/O worker process 306 can be configured to support the mirroring of two disks. As such, the SAL I/O worker process 306 can issue a transport command to one or both of the transport processes 500 that support the member disks of the mirror.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for scalable data storage, comprising:
receiving a command for a logical storage device, the logical storage device being associated with a logical device queue, the logical device queue comprising a plurality of command slots for storing commands, and a plurality of input/output (I/O) worker processes being associated with the logical device queue and a separate I/O worker process being associated with each respective command slot of the logical device queue;
storing the command in a command slot of the logical device queue;
providing an index of the command to the I/O worker process associated with the command slot storing the command using a device queue process; and
facilitating completion of the command by the I/O worker process associated with the command slot storing the command by the I/O worker process obtaining the command from the logical device queue.

2. A method as recited in claim 1, further comprising providing the command from the I/O worker process to a transport process, wherein the transport process is associated with a physical storage device.

3. A method as recited in claim 2, further comprising the operation of converting the command into a protocol specific command suitable for use with the associated physical storage device.

4. A method as recited in claim 1, wherein the device queue process is a block device queue process associated with a block device driver within an operating system.

5. A method as recited in claim 1, wherein the device queue process is an application device queue process associated with an application, wherein the application provides commands to the logical storage device.

6. A method as recited in claim 1, wherein each logical storage device is associated with a device queue process.

7. A method as recited in claim 1, wherein each I/O worker process is capable of associating with at least two transport processes.

8. An architecture for scalable data storage, comprising:
a logical storage device having a logical device queue, wherein the logical device queue includes a plurality of command slots for storing input/output commands;
a plurality of I/O worker processes, each associated with a command slot of the logical device queue;
a logical device queue process associated with the logical storage device,
wherein the logical device queue process provides an index for a command stored in the logical device queue to an I/O worker process associated with the command slot storing the command, and wherein the I/O worker process obtains the command from the logical device queue and facilitates completion of the command.

9. An architecture as recited in claim 8, further comprising a plurality of transport processes, wherein each transport process is associated with a physical storage device.

10. An architecture as recited in claim 9, wherein each transport process converts commands into protocol specific commands suitable for use with the associated physical storage device.

11. An architecture as recited in claim 9, wherein the device queue process is a block device queue process associated with a block device driver within an operating system.

12. An architecture as recited in claim 9, wherein the device queue process is an application device queue process associated with an application, wherein the application provides commands to the logical storage device.

13. An architecture as recited in claim 9, wherein each logical storage device is associated with a device queue process.

14. An architecture as recited in claim 9, further comprising an event manager that handles events occurring within the architecture.

15. An architecture as recited in claim 9, further comprising storage access layer, wherein the storage access layer creates a device queue process for each detected logical storage device.

16. A method for scalable data storage, comprising:
receiving a command for a logical storage device, the logical storage device being associated with a logical device queue, the logical device queue comprising a plurality of command slots for storing commands, and wherein a plurality of input/output (I/O) worker processes being associated with the logical device queue and a separate I/O worker process being associated with each respective command slot of the logical device queue;
storing the command in the logical device queue;
providing an index of the command to the I/O worker process associated with the command slot storing the command using a device queue process;
obtaining by the I/O worker process the command from the logical device queue;
providing the command from the I/O worker process to a transport process, the transport process being associated with a physical storage device; and
converting the command into a protocol-specific command suitable for use with the associated physical storage device.

17. A method as recited in claim 16, wherein the device queue process is a block device queue process associated with a block device driver within an operating system.

18. A method as recited in claim 16, wherein the device queue process is an application device queue process associated with an application, wherein the application provides commands to the logical storage device.

19. A method as recited in claim 16, wherein each logical storage device is associated with a device queue process.

20. A method as recited in claim 16, wherein each I/O worker process is capable of associating with at least two transport processes.

* * * * *